(12) United States Patent
Lee et al.

(10) Patent No.: US 10,001,694 B1
(45) Date of Patent: Jun. 19, 2018

(54) HIGH-FREQUENCY LIGHT MODULATOR

(71) Applicant: Keysight Technologies, Inc., Minneapolis, MN (US)

(72) Inventors: Gregory S. Lee, Mountain View, CA (US); Christopher Coleman, San Jose, CA (US); Dietrich W. Vook, Mountain View, CA (US); Thomas S. Low, Sebastopol, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 254 days.

(21) Appl. No.: 14/541,014

(22) Filed: Nov. 13, 2014

(51) Int. Cl.
*G02F 1/035* (2006.01)
*G02F 1/225* (2006.01)
*G02F 1/21* (2006.01)

(52) U.S. Cl.
CPC ...... *G02F 1/2255* (2013.01); *G02F 2001/212* (2013.01)

(58) Field of Classification Search
None
See application file for complete search history.

(56) References Cited

U.S. PATENT DOCUMENTS

| | | | | |
|---|---|---|---|---|
| 5,129,017 A | * | 7/1992 | Kawano | G02F 1/0356 385/2 |
| 5,764,822 A | * | 6/1998 | Madabhushi | G02F 1/2255 385/131 |
| 5,790,719 A | * | 8/1998 | Mitomi | G02F 1/0356 385/2 |
| 6,429,959 B1 | * | 8/2002 | Gopalakrishnan | G02F 1/0316 359/254 |
| 7,212,326 B2 | * | 5/2007 | Wooten | G02F 1/225 359/237 |
| 2002/0151113 A1 | * | 10/2002 | Hung | G02B 6/4201 438/127 |
| 2002/0190359 A1 | * | 12/2002 | Shaw | G02F 1/0305 257/678 |
| 2005/0213862 A1 | * | 9/2005 | Kawanishi | G02F 1/0123 385/1 |
| 2008/0170821 A1 | * | 7/2008 | Kissa | G02F 1/0316 385/14 |
| 2015/0063742 A1 | * | 3/2015 | Wesstrom | G02F 1/225 385/3 |

* cited by examiner

*Primary Examiner* — Chris Chu

(57) ABSTRACT

An optical modulator that is adapted to modulate a light signal at very high RF frequencies and provide the modulating RF signal to equipment separate from the modulator is disclosed. The modulator includes a Mach-Zehnder Modulator in which light loses due to the crossing of the RF waveguide conductors and the optical waveguides are reduced. In addition, problems arising from asynchrony between the RF signals and the optical signals are reduced. The modulator also reduces signal losses due to resonances in the modulator. The modulator can be configured to be used in test probes that require a compact configuration that is adapted to designs having multiple test probes that are proximate to each other.

9 Claims, 11 Drawing Sheets

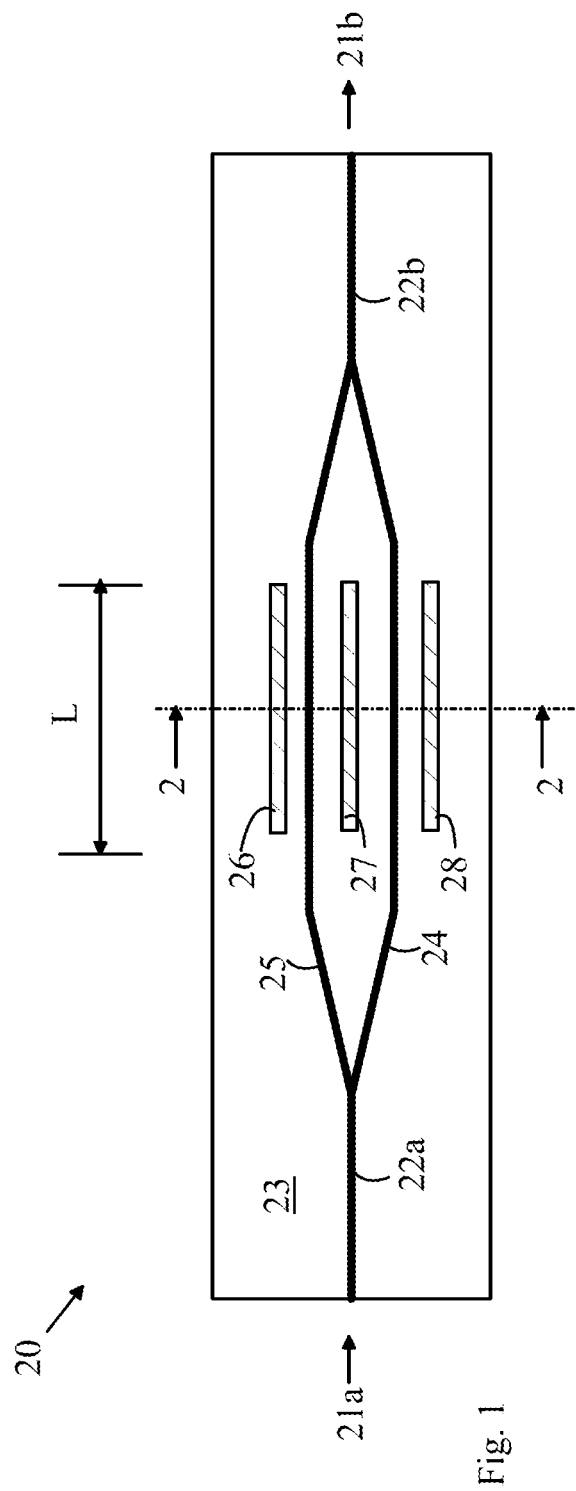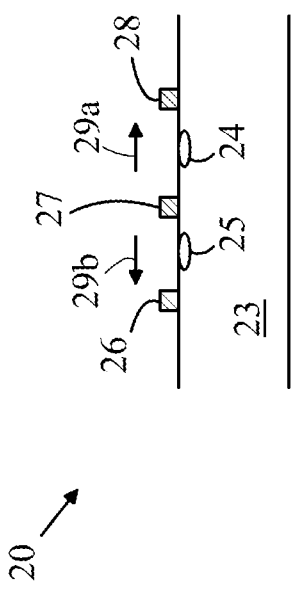

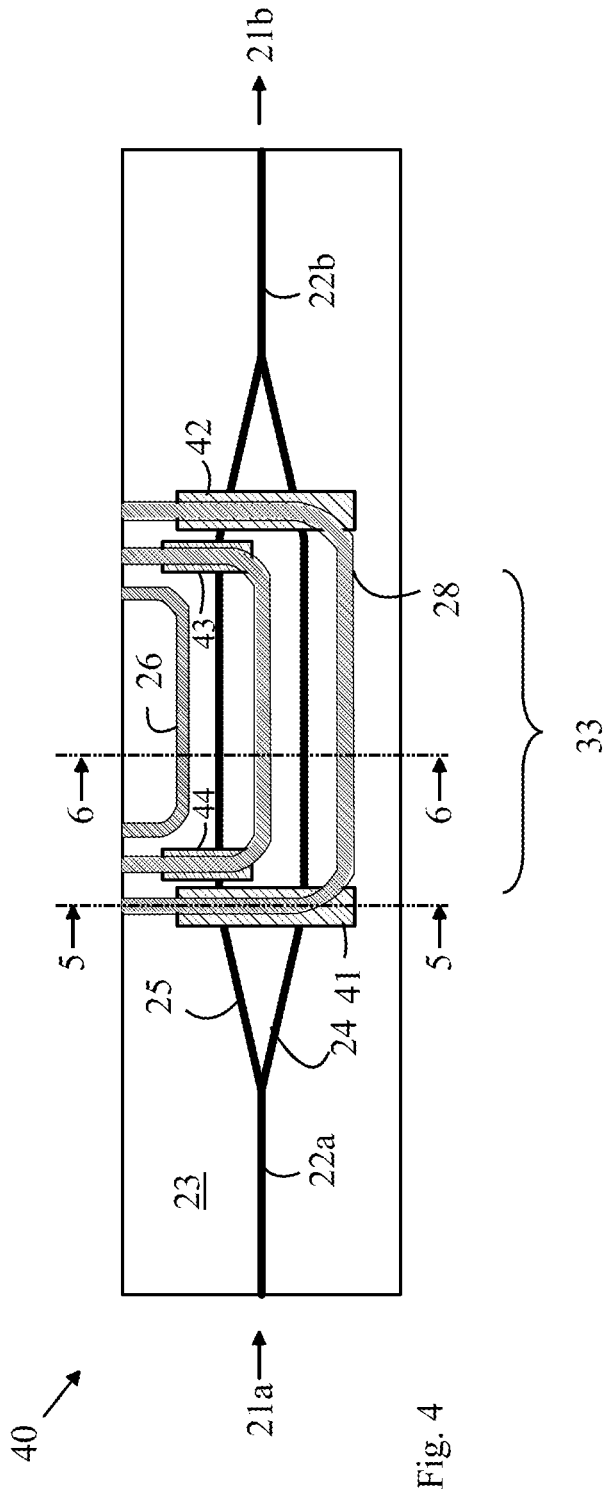
Fig. 4
Fig. 5
Fig. 6

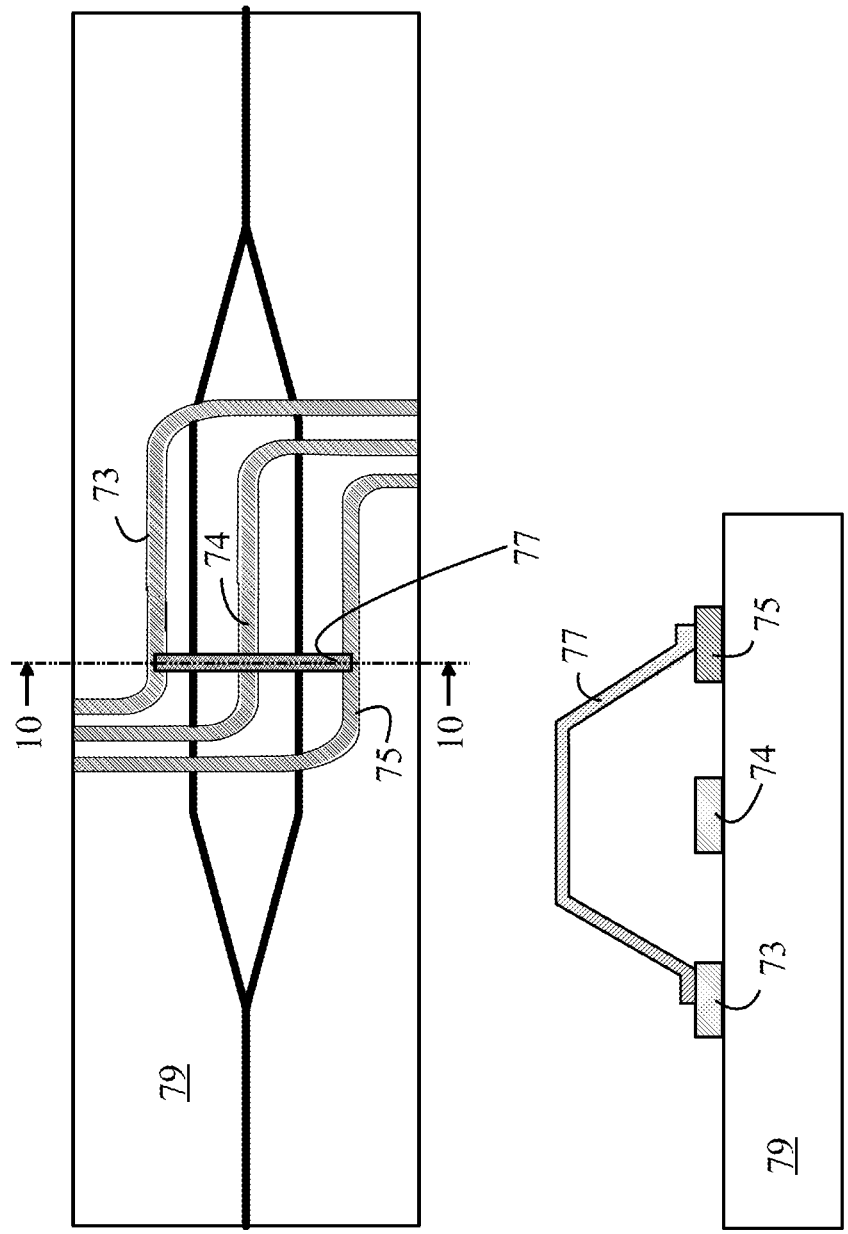

HIGH-FREQUENCY LIGHT MODULATOR

BACKGROUND

Test equipment for network analysis must now operate at a wide band of frequencies above 100 GHz. Purely electrical components that are to operate in this frequency range present significant challenges. As a result, systems in which part of the processing is performed in the optical domain have been developed. For example, an amplifier for amplifying a signal in a band of frequencies from 30 to 300 GHz is difficult to implement in conventional electrical components. However, if the signal is used to modulate a light signal, the range of optical frequencies that must be amplified is very narrow, and hence, the signal can be amplified by amplifying the optical signal using conventional optical amplifiers and then the signal can be recovered by demodulating the amplified optical signal.

Test equipment that utilizes optical processing has been developed to address the challenges of working over a broad band of frequencies in the 100 GHz range. For example, a co-pending patent application, PCT/US2014/021788, filed Mar. 7, 2014, describes a network analyzer that requires a light signal modulated in this frequency range and the RF signal used to modulate that signal. Providing compact probes that generate the modulated light signal and also provide RF for coupling to a device under test (DUT) pose significant challenges.

SUMMARY

The present invention includes a modulator having a Mach-Zehnder Modulator (MZM) characterized by first and second optical waveguides in a modulation layer and a coplanar waveguide (CPW). The CPW includes first, second, and third conductors on the modulation layer and has segments that are substantially parallel to the first and second optical waveguides. One of the first, second, or third conductors includes a crossing segment that crosses over one of the first and second optical waveguides at a crossing point. The crossing segment is separated from that optical waveguide by a layer of dielectric material in a region including the crossing point. The layer of dielectric inhibits energy transfer between light in the one of the first, second, or third conductors and the optical waveguide at the crossing segment.

In another embodiment, the modulator includes an MZM characterized by first and second optical waveguides on a modulation layer and a CPW on a first surface of the modulation layer, the CPW includes first, second, and third conductors in the modulation layer and has segments that are substantially parallel to the first and second optical waveguides. The modulator also includes an input configured to receive an input light signal to be modulated and to split the input light signal into first and second input light signals that are coupled to the first and second optical waveguides, respectively. A dielectric layer is bonded to a second surface of the modulation layer. The dielectric layer is characterized by a first index of refraction and the modulation layer is characterized by a second index of refraction that is greater than 1.15 times the first index of refraction and wherein the modulation layer has a thickness that is less than one quarter of the distance between the first and second conductors of the CPW.

In one aspect of the present invention, a modulator also includes a plurality of conducting bridges connecting the first and third conductors.

In another aspect of the invention, the modulator includes first and second bias electrodes positioned to create a first constant electric field in the first optical waveguide prior to an optical signal in that waveguide being modulated by a signal on the CPW. The modulator can also include a third bias electrode positioned to create a second constant electric field on the second optical waveguide, the second constant electric field having a direction opposite to that of the first electric field.

In a still further aspect of the invention, the first, second, and third conductors of the CPW are characterized by a CPW metal height above the modulation layer, and the first and second bias electrodes are characterized by a bias electrode height, the bias electrode height being less than 0.1 times the CPW metal height.

In another aspect of the invention, the modulator includes a substrate having first and second opposing sides, the first opposing side includes an RF input port configured to receive and couple an RF signal to the CPW, and the second opposing side includes an RF output port that couples the RF signal to a device external to the modulator after the RF signal has traversed the CPW.

In yet another aspect of the invention, the modulator includes an optical waveguide for combining light signals in the first and second optical waveguides after the light signals have been modulated to form a combined light signal and redirecting the combined light signal to an output port, the input and output ports are on the same surface of the modulator.

In another aspect of the invention, the combined light signal is input to an optical waveguide having a 180 degree bend constructed in a material different from the modulation layer.

In a further aspect of the invention, the modulator includes a photodiode configured to receive a first modulated light signal and to generate an RF signal on the CPW in response to the first modulated light signal. The first, second, and third conductors can be connected to an RF output port configured to provide access to the RF signal. The first, second, and third conductors connect the photodiode to the output port without executing any bends in another aspect of the invention.

In yet another aspect of the invention, the modulator includes a substrate having first and second opposing sides. The first opposing side includes the RF output port, and the second opposing side includes first and second optical ports. The first optical port is configured to receive an input optical signal that is to be modulated, and said second optical port is configured to output said input optical signal after the input optical signal has been modulated.

In another aspect of the invention the light signal to be modulated is input on an optical port that includes a sinuous Y-junction that splits the optical signal into first and second optical signals that are coupled to the first and second optical waveguides, respectively. The first and second optical waveguides are likewise coupled to an optical output port by another sinuous Y-junction.

In a still further aspect of the invention, the modulator is configured to operate at RF frequencies below a maximum RF frequency. The modulator also includes a layer of RF absorbing material configured to dampen resonances in the modulator that occur at frequencies below the maximum RF frequency.

BRIEF DESCRIPTION OF THE DRAWINGS

FIG. 1 illustrates a top view of a Mach-Zehnder Modulator.

FIG. 2 illustrates a cross-sectional view of the Mach-Zehnder Modulator shown in FIG. 1.

FIG. 4 is a top view of a Mach-Zehnder Modulator.

FIG. 5 is a cross-sectional view of a Mach-Zehnder Modulator.

FIG. 6 is a cross-sectional view of a Mach-Zehnder Modulator.

FIG. 9 illustrates a top view of the placement of a single air-bridge conductor in a modulator according to one aspect of the present invention.

FIG. 10 illustrates a cross-sectional view of the placement of a single air-bridge conductor in a modulator according to one aspect of the present invention.

DETAILED DESCRIPTION

Figure 3:
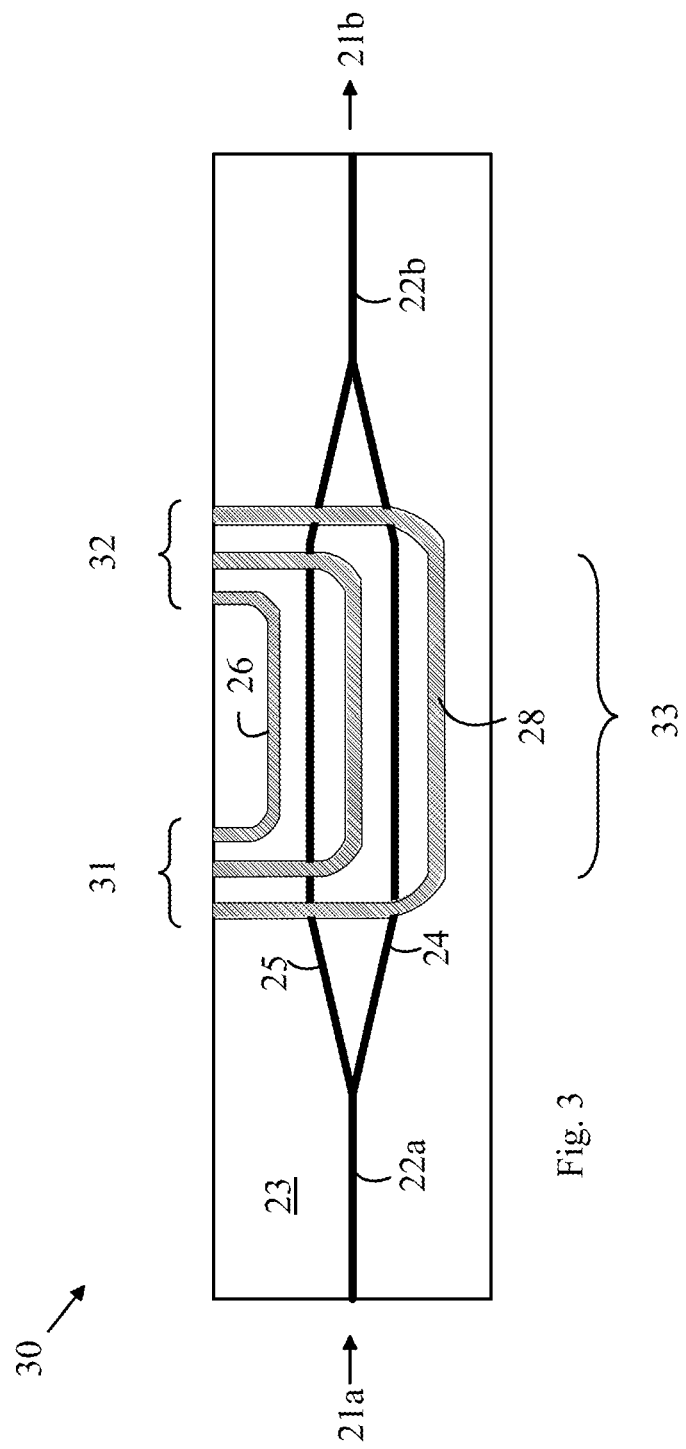
FIG. 3 is a top view of a Mach-Zehnder Modulator illustrating the problems in coupling the RF signal to the conductors on the top surface of the substrate.

The manner in which the present invention provides its advantages can be more easily understood with reference to FIGS. 1 and 2, which illustrate the basic structures in an MZM. There are a number of different MZMs in the literature. For the purposes of the present discussion, an MZM is defined to include first and second substantially parallel optical waveguides in a modulation layer constructed from a material having an index of refraction that varies as a function of an electric field applied to that medium. The MZM also includes a CPW having first, second, and third conductors positioned to generate a first electric field at the first waveguide and a second electric field at the second waveguide. The first and second electric fields result in the light in one optical waveguide being advanced in phase while the light in the other optical waveguide is retarded in phase. An optical splitter splits a light signal from an input optical port into first and second light signals that traverse said first and second optical waveguides, respectively. An optical combiner combines said first and second light signals after said first and second light signals have traversed said first and second optical waveguides. The phase changes introduced by the electric fields result in the light signals interfering with one another, and hence, the combined light signal is modulated at a frequency and amplitude that is determined by the frequency and amplitude of the wave form on the CPW.

The modulation signal is coupled to a modulation input port. In the applications of interest here, the modulation signal is in the 1 MHz to 2 THz frequency range. In many applications of interest, the modulation signal is outputted from the MZM after it has traversed the CPW and is used by other devices. The present invention is directed to a number of improvements in this type of modulator.

Refer now to FIG. 1, which is a top view of an MZM, and FIG. 2, which is a cross-sectional view of MZM 20 through line 2-2 shown in FIG. 1. A light signal to be modulated is introduced into an optical input port 21a which couples that light to a waveguide 22a that is formed in an optically active substrate 23 constructed from a material such as $LiNbO_3$. The $LiNbO_3$ has the property that the index of refraction experienced by the light signal is a function of the electric field in the $LiNbO_3$. As a result, the phase of the light signal is either advanced or retarded depending on the direction and strength of the applied electric field.

Waveguide 22a splits into two waveguides shown at 24 and 25. The waveguides are typically constructed by diffusing a material such as Ti into the surface of substrate 23. The light traveling in waveguide 25 is subjected to an electric field in the opposite direction to that of the light traveling in waveguide 24 as indicated by arrows 29a and 29b shown in FIG. 2. The light is polarized parallel to the top plane of the MZM so that the electric field is either parallel or anti-parallel to the arrows 29a or 29b. The fields change the dielectric constant in that direction and the light is modulated. Light polarized perpendicular to the surface is not modulated.

The electric fields are generated by applying an RF signal between signal conductor 27 and ground conductors 26 and 28 of a CPW. Hence, the phase of the light in one waveguide will be advanced and the phase of the light in the other waveguide will be retarded by an amount that depends on the RF signal applied between ground conductors 26-28. When the light from the two waveguides recombines in waveguide 22b, the two light signals will interfere with one another due to the differences in phase, and hence, the light leaving MZM 20 via output port 21b will be modulated at a frequency and amplitude determined by the RF signal.

While the basic principles of an MZM are relatively straightforward, implementing such a modulator in a compact configuration at very high frequencies poses a number of challenges that have limited the practical realization of such a modulator. The extent of the phase advancement or retardation for a given material and field depends on the length, L, of the field region, longer field regions providing increased modulation of the light signal. However, in practice, merely increasing L does not provide the desired benefit. In addition, minimizing power losses in both the RF and optical pathways presents additional challenges.

Refer now to FIG. 3, which is a top view of an MZM illustrating the problems in coupling the RF signal to the conductors on the top surface of the substrate. Typically, the RF signal is coupled using a CPW via an input port 31. The RF signal exits MZM 30 via an output port 32 or is terminated on the substrate at the desired impedance level. To avoid obstruction between the RF and optical connectors, the RF ports are located on the sides of the substrate that are not occupied by the optical light guides that input the light signal being modulated and output the modulated light signal. This configuration leads to significant optical light losses.

The embodiment shown in FIG. 3 requires the metallic RF conductors to cross over waveguides 24 and 25. If the metallic conductors are directly in contact with the surface of the waveguides as shown in FIG. 2, significant light losses are encountered as the electric and magnetic fields associated with the light signal overlap with the metallic conductors and energy is transferred to the conductors leading to loses in the light signal being modulated. To avoid such light losses, the metallic conductors need to be separated from the surface of the $LiNbO_3$ substrate by a layer of dielectric material to reduce this coupling. However, if a layer of dielectric is inserted under the metal layers in the modulation region 33, then the electric field from the conductors will be attenuated at the light waveguide due to the separation of the metal layers from the top surface of substrate 23. In this case, the modulation efficiency is reduced, and hence, either the power levels need to be increased or the length of the modulation region needs to be increased to compensate for the loss in efficiency. Neither of these solutions is desirable from a power or cost point of view. Furthermore, increasing the modulator length results in increased electrical loss at high frequencies and reduced modulator bandwidth due to inevitable velocity mismatch between the optical and electrical waves.

In one aspect of the present invention, dielectric layers are selectively inserted between the metal conductors and surface of substrate 23 at those locations at which the metal conductors cross the optical waveguides. In modulation region 33, the metal conductors are placed directly on the surface of substrate 23, and hence, the loss of modulation efficiency is avoided while reducing the losses in the light signals. Refer now to FIGS. 4-6, which illustrate an MZM according to one embodiment of the present invention. FIG. 4 is a top view of MZM 40, and FIGS. 5 and 6 are cross-sectional views through lines 5-5 and 6-6, respectively. MZM 40 shares a number of features in common with MZM 30 discussed above. Those features that serve the same function as features shown in FIG. 3 have been given the same numerical designations. In the regions in which the RF conductors cross the optical waveguide, a layer of dielectric is used to separate the RF conductors from the top surface of substrate 23 and thus reduce the energy losses. Exemplary dielectric layers are shown at 41-44. In modulation region 33, the RF conductors are deposited directly on the surface of substrate 23 thereby maximizing the electric field intensity at the optical waveguide.

Dielectric layers 41-44 are patterned prior to the deposition of the RF conductors. The thickness of the dielectric layers is a tradeoff between reducing the evanescent attenuation of the light signal, which favors thicker layers, and minimizing deleterious discontinuities in the RF waveguide. The dielectric layer will be defined to inhibit the evanescent attenuation if the evanescent attenuation is reduced by at least a factor of 20 dB relative to a configuration in which the metal lines are directly deposited on the modulating layer. The dielectric can be formed from a layer of polyimide or other dielectric that can be deposited at the desired thickness. The minimum thickness for the dielectric layer depends on the refractive index of the dielectric. In the case of polyimide (index=1.7-1.8), the minimum thickness is approximately 1 μm. In the case of Benzocyclobutene or $SiO_2$ (index=1.4-1.5), the minimum thickness is approximately 0.7 μm. In the case of $Si_3N_4$ (index=1.98), the minimum thickness is approximately 5 μm.

From a cost perspective, reducing the size of the MZM is important, as more devices can be obtained from a single wafer of $LiNbO_3$. As noted above, the optical waveguide must split into the two arms prior to entering the modulating region and be rejoined prior to leaving the modulator. Typically, these transitions are provided by a splitter consisting of a "Y" junction in the optical waveguides. For the purposes of the present discussion, a "Y" junction is defined to be two straight segments that diverge at an angle from a common point. The divergence angle of the Y-junction is typically a very small angle that is dictated by the low index contrast between the waveguides in $LiNbO_3$ and the surrounding $LiNbO_3$. Divergence angles of 0.5 degrees are typically used. To provide sufficient separation between the two waveguides in the modulation region (typically of the order of 100 microns), a long path is needed between input port 21a and modulation region 33. A distance of typically 10 mm is required to provide the required separation. Similarly, another long path is needed between modulation region 33 and output port 21b to implement the combiner that generates the output optical signal. These two long paths increase the cost of the modulator and inhibit designs that require small size.

In another aspect of the invention, the straight Y-junctions discussed above are replaced by "sinuous Y-junctions". In prior art devices, the Y-junctions consist of three straight segments that are joined at a common point. Two of the segments diverge from the common point at a fixed angle. For the purposes of the present discussion, a sinuous Y-junction is defined to be a junction having three arms joined at a common point, one arm being connected to an input or output optical port and the other two arms diverging from the common point at an angle that varies as a function of the distance from the common point, as opposed to a constant divergence angle.

Figure 7:
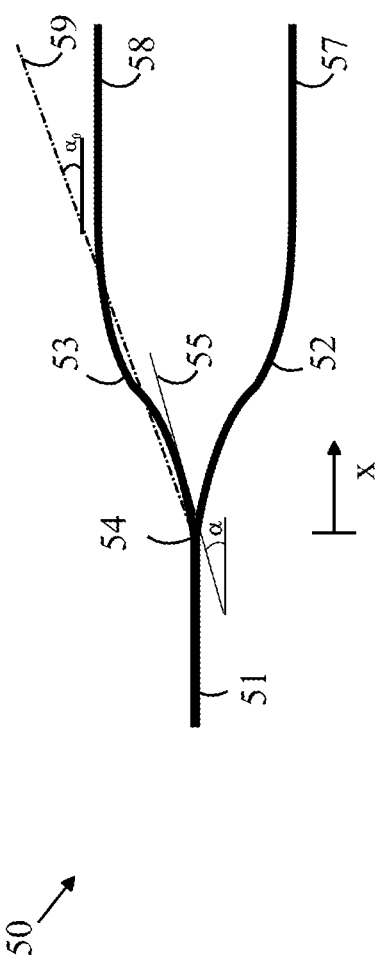
FIG. 7 illustrates a sinuous Y-junction.

Refer now to FIG. 7, which illustrates a sinuous Y-junction according to the present invention. Sinuous Y-junction 50 includes waveguide arms 51-53 that are joined at common point 54. Waveguide arms 52 and 53 diverge from point 54 and terminate in parallel linear segments 57 and 58, respectively. The tangent to waveguide arm 53 at a distance x from point 54 is shown at 55. The angle of the tangent is denoted by α. This angle varies as a function of the distance, x, from point 54. For a sinuous Y-junction, $\alpha(x) < \alpha_{max}$, where $\alpha_{max}$ is the maximum angle that would be allowed for a straight Y-junction. The maximum angle for a straight Y-junction is determined by the need to avoid birefringent effects in the $LiNbO_3$. Typically, $\alpha_{max} < 3$ degrees. Define a line 59 between point 54 and the beginning of one of the straight segments. The angle between this line and the straight section will be denoted by $\alpha_0$. If the transition is provided by a straight Y-junction, $\alpha_0$ would need to be less than $\alpha_{max}$. In a sinuous Y-junction according to the present invention, the function, $\alpha(x)$ is chosen such that $\alpha_0 > \alpha_{max}$. In one aspect of the invention, the function $\alpha(x)$, is chosen such that the local radius of curvature is always greater than or equal to some minimum radius of curvature that depends on the modulating substrate material. In the case of $LiNbO_3$, the preferred minimum radius of curvature is 1 cm. By using sinuous Y-junctions, the amount of substrate that must be used to provide the splitting and rejoining of the waveguides can be reduced by a factor of two.

The CPW portion of the MZM is less than ideal, and hence, introduces distortions in the modulating signal. For example, in embodiments such as those shown in FIGS. 4-6, ground conductors 26 and 28 have substantially different lengths due to the presence of bends. In addition, these bend regions are subject to the $LiNbO_3$ electrical birefringence. This arrangement introduces distortions into the RF signal used to modulate the light signal. If the apparatus using the modulated light signal also requires the RF signal, these distortions can cause problems.

Figure 8:
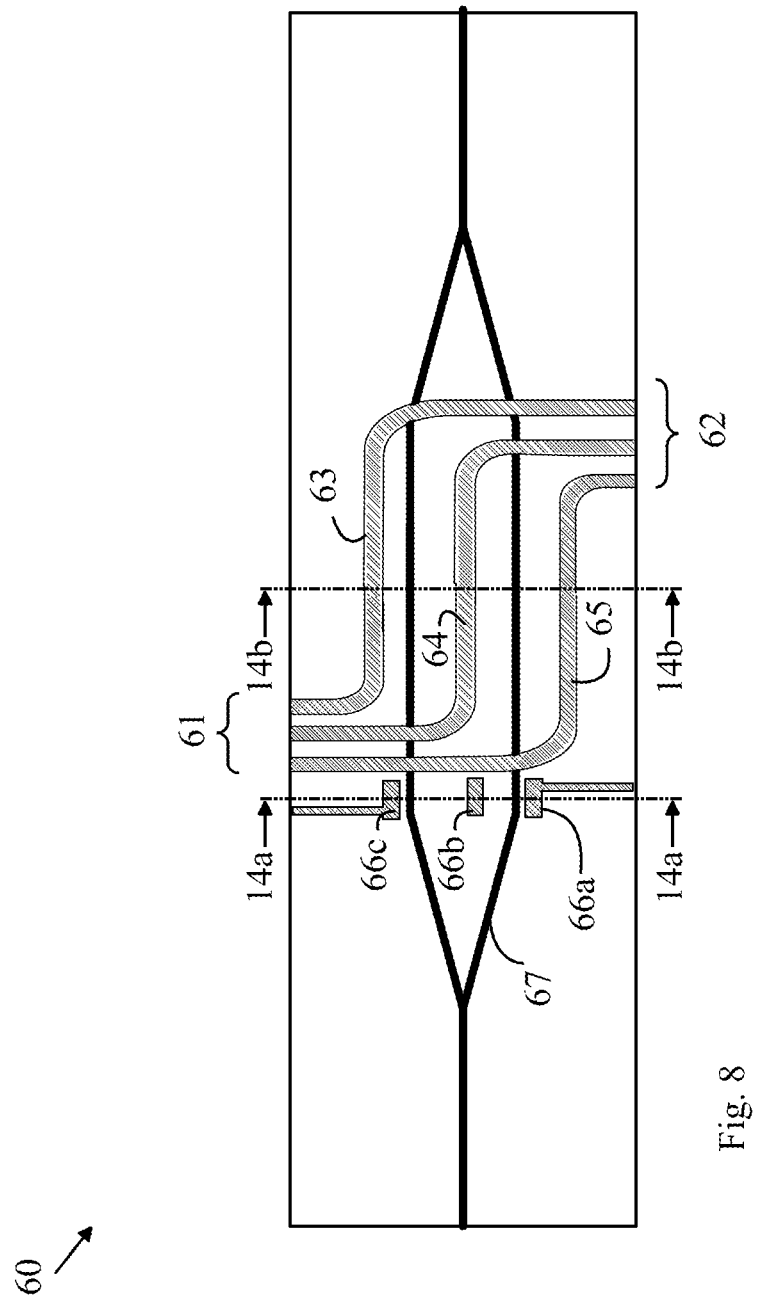
FIG. 8 illustrates another embodiment of a light modulator according to the present invention.

Refer now to FIG. 8, which illustrates another embodiment of a light modulator according to the present invention. MZM 60 is similar to sinuous Y-junction 50 discussed above in terms of the basic mode of operation. However, in MZM 60, the RF ground conductors 63-65 of the CPW waveguide that connects RF input port 61 to RF output port 62 are more nearly equal. This arrangement is facilitated by placing RF input port 61 on the opposite side of MZM 60 from RF output port 62. In addition, each path has one right turn and one left turn. Hence, distortions introduced at a right handed bend tend to be undone by the distortions introduced by a left handed bend.

Distortions created by the bends between RF input port 61 and the modulation region are also important. Routing the RF signal from RF input port 61 to the modulation region requires a bend in the conductors of the CPW. The bends can introduce distortions and/or reflections in the RF signal which interfere with the operation or efficiency of the modulator if not properly constructed. This design is further complicated by the difference in index of refraction of the modulation layer material with respect to the direction of travel of the RF signal relative to the modulation layer. In one aspect of the invention, the bends have boundaries that are elliptical rather than circular. For the purposes of this discussion, an elliptical bend is defined to be a bend in a conductor in which the inside edge of the bend is a first ellipse and the outside edge of the bend is a second ellipse. The parameters of the ellipses are set to maintain the impedance of the CPW at the desired value around the bend. In addition, the inner surface of the bend must be adjusted with respect to the outer surface of the bend to maintain the same path length.

In some applications, it is advantageous to introduce a fixed phase shift into one of the light signals. Consider the case in which the phase shifts introduced by the modulation signal are much less than 90 degrees. In this case, the changes in amplitude introduced by the RF modulation will be relatively small compared to the amplitude of the light signal being modulated, and the modulation will be a small signal on a large amplitude optical signal. If the phases of the light signals are adjusted to be out of phase by 90 degrees prior to modulation, then the amplitude of the constant light signal will be reduced and the modulation will be a much larger portion of the output light signal. In one aspect of the invention. MZM 60 also includes first and second DC bias electrodes 66a and 66b that introduce a separate phase shift into the light traveling in optical waveguide 67. To simplify the drawing, the connection to DC bias electrode 66b has been omitted from the drawing. To enhance the level of fixed phase shift, a third DC bias electrode 66c can be included such that one bias potential is presented on DC bias electrode 66b and DC bias electrodes 66c and 66a are held at the same second bias potential.

The embodiments of the modulators discussed above assume that the RF ground conductors 63 and 65 are synchronized and that impedance of the CPW is maintained at the desired value as the CPW makes various turns. The RF signal is a traveling wave that propagates down the CPW waveguide formed by RF ground conductors 63-65. If the potentials in ground conductors do not match, the phase shifts introduced in the optical paths will not match. The path lengths of the two ground conductors differ between the RF input port 61 and the modulation region of the modulator. In addition, the area of the bends in the conductors includes different geometrical shapes that alter the behavior of the CPW. Hence, differences in the RF signal between conductor 64 and each of the ground conductors can be present in the modulation region. In addition, these non-ideal CPW effects can introduce distortions into the RF signal leaving the modulator, and hence, present problems in designs in which the RF signal is used to stimulate a device in a test system. The present invention reduces these distortions by connecting the ground conductors to each other using bridges. The two ground conductors are connected by conductors that cross over conductor 64. These cross-over conductors are separated from conductor 64 by air, and hence, will be referred to as air-bridge conductors in the following discussion.

Refer now to FIGS. 9 and 10, which illustrate the placement of a single air-bridge conductor in a modulator according to one aspect of the present invention. FIG. 9 is a top view of modulator 70, and FIG. 10 is a cross-sectional view through line 10-10 shown in FIG. 9. To simplify the discussion, only a single air-bridge conductor is shown; however, it is to be understood that a plurality of such air-bridge conductors can be introduced along the length of the CPW including air-bridge conductors between the regions having bends. To further simplify the discussion only the CPW formed by conductors 73-75 and the optical waveguides in substrate 79 are shown. However, it is to be understood that any of the other conductors or features discussed above can be implemented in modulator 70. Air-bridge conductor 77 can be formed using conventional wire bonding techniques. Alternatively, a metal deposition process that applies the conductor over a dielectric that is then removed can be utilized.

At very high RF frequencies, i.e., frequencies >100 GHz, coupling the RF signal onto and off of the modulator using RF connectors poses significant challenges, particularly in embodiments in which a number of modulators must be accommodated in a small area to provide multiple modulated light signals and the accompanying RF signals. In the above embodiments, the RF signal is coupled electrically to the modulator using a connector or RF probe array. For the purposes of the present discussion, an RF probe array is an interface that transfers signals from a CPW on a first substrate to a CPW on a second substrate without using coaxial cable while maintaining the impedance matching of the two CPWs. Inexpensive connectors at these frequencies pose significant challenges. Using RF probes to make the connections also presents challenges as the locations of the probes on the side of the MZM is not always compatible with the device that is utilizing the MZM.

In one aspect of the invention, the RF signal is coupled optically to the modulator with the aid of a photodiode. For the purposes of the present discussion, it will be assumed that a first RF modulated light signal at one wavelength is available and this RF modulation is to be transferred to a second light signal in the modulator that may be at a different wavelength. The first modulated light signal can be generated in another MZM that is not confined by space requirements or the need to have the RF signal available for a device that is external to the MZM.

Figure 11:
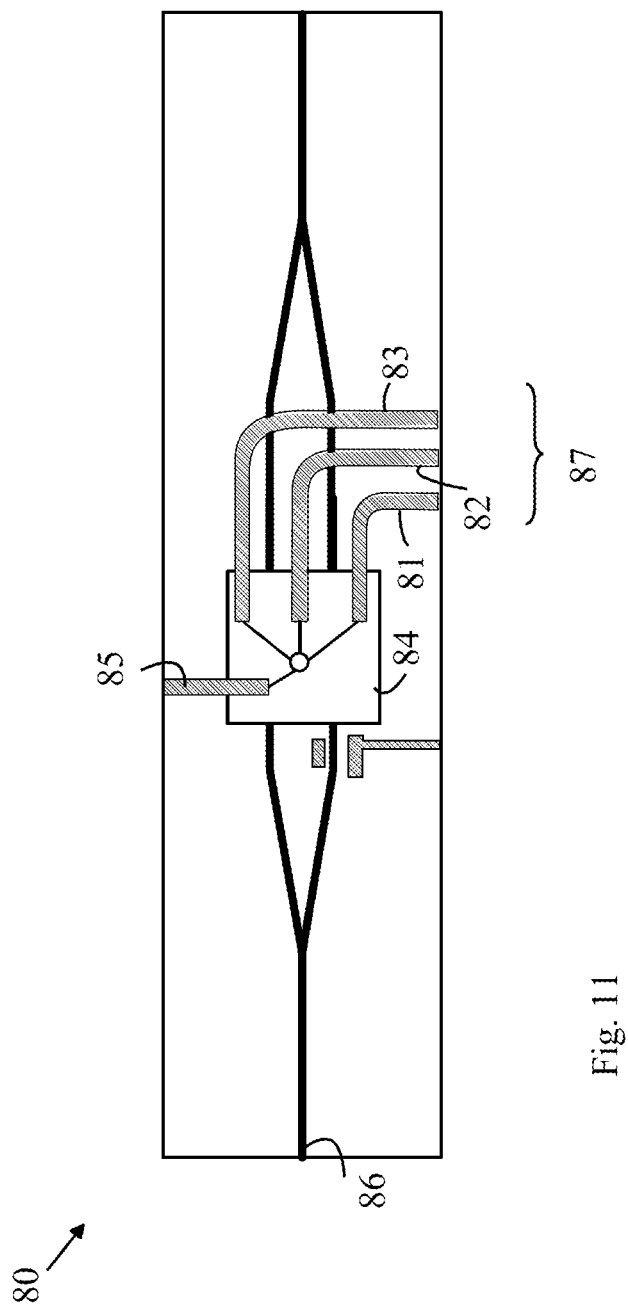
FIG. 11 illustrates another embodiment of a modulator according to the present invention.

Refer now to FIG. 11, which illustrates another embodiment of a modulator according to the present invention. FIG. 1 is a top view of MZM 80. In MZM 80, the RF signal is optically coupled to the modulator by a first modulated optical signal. The first modulated optical signal is directed to a high speed photodiode 84 that is connected to the RF conductors 81-83 that form a CPW on the surface of the LiNbO$_3$ substrate. The photodiode is biased via a bias connection 85. A second optical signal that is to be modulated is input on port 86 of MZM 80. The operation of the modulator is analogous to that described above, except that the RF signal that powers the RF conductors is generated on the modulator from the first modulated optical signal. The generated RF signal exits MZM 80 via RF output port 87 and can be used by the device that receives the modulated second optical signal. It should be noted that the CPW in MZM 80 only has one set of bends, and hence, distortions introduced by the bends are reduced in this type of embodiment.

The first modulated optical signal can be coupled to high speed photodiode 84 via an optical fiber that does not require access to the side of the MZM, and hence, does not significantly increase the size of MZM 80. Furthermore, small optical couplers are inexpensive. However, the RF output port 87 still poses challenges in embodiments in which the size of the modulator is critical and the placement of the connections is also critical. For example, in some applications, it is advantageous to have a modulator configuration in which the RF signal leaves the modulator at one end and the second optical signal discussed above, enters and exits at the other end.

Figure 12:
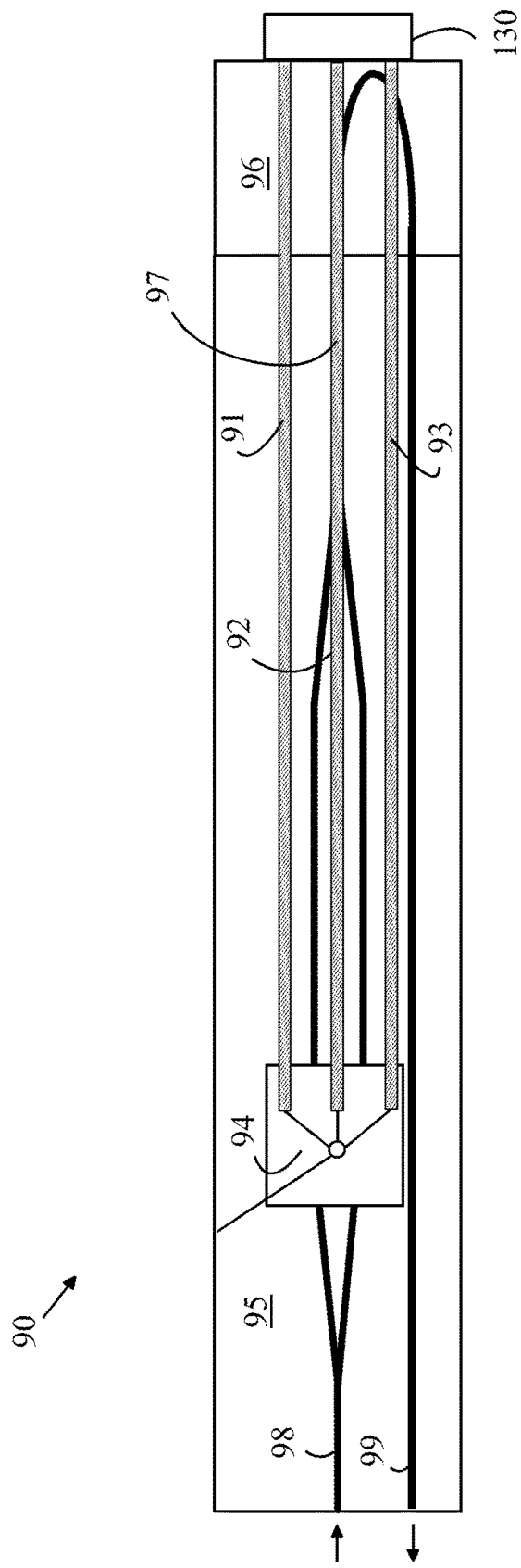
FIG. 12 illustrates a top view of another embodiment of a Mach-Zehnder Modulator according to the present invention.

Refer now to FIG. 12, which illustrates a top view of another embodiment of an MZM according to the present invention. MZM 90 also utilizes an optically coupled RF signal that is converted by a photodiode 94 into the modulating RF signal that is applied to the CPW formed by conductors 91-93. The second light signal that is to be modulated by the RF signal of the first light signal is input on waveguide 98. The modulated version of this light signal exits on waveguide 99. The RF signal generated by photodiode 94 is output on RF interface 130 as an electrical signal. RF interface 130 can include an RF connector or probes for coupling the RF signal to an integrated circuit or printed circuit board. It should be noted that the CPW on which the RF signal travels does not have bends, and hence, the distortions discussed above with respect to such bends are eliminated.

MZM 90 provides a compact probe for coupling an RF signal to a DUT while providing an optical signal modulated by the same RF signal to a test instrument. To provide the output optical signal on the same side of the modulator as the input optical signal, waveguide 97 must be bent through 180 degrees. As noted above, providing such a bend with a small radius of curvature presents challenges on LiNbO$_3$ substrate 95 due to the small difference in index of refraction between the waveguide region and surrounding LiNbO$_3$. MZM 90 overcomes this problem by including a region 96 that is constructed from a different material that supports a waveguide having a much larger difference in index of refraction than substrate 95 from which region 96 is constructed. For example, region 96 can be constructed from SiO$_2$ with a Si$_3$N$_4$ waveguide. Region 96 can be added to substrate 95 by bonding the two regions such that the sections of waveguide 97 are properly aligned with one another.

Conventional MZM modulators suffer from RF energy losses due to resonances in the substrate. These losses distort the RF signal leaving the modulator and alter the amplitude modulation of the light signal. The substrate can be viewed as an RF cavity that has resonances that are excited by the RF signal used to modulate the light signal. When the RF frequency matches one of these resonance frequencies, energy is removed from the RF signal.

The frequencies of these resonances are determined by the physical dimensions of the substrate, particularly, the thickness of the substrate. Prior art MZMs alter the shape of the substrate to remove the undesired resonances. At low RF frequencies, these energy losses can be reduced by thinning the substrate such that the lowest resonance frequency is at a value above the RF frequencies that are being used to modulate the light, and hence, the resonances are not excited by the RF signal. At very high RF frequencies, this approach presents significant challenges because the resulting substrate is too thin to provide structural integrity to the modulator.

Figure 13:
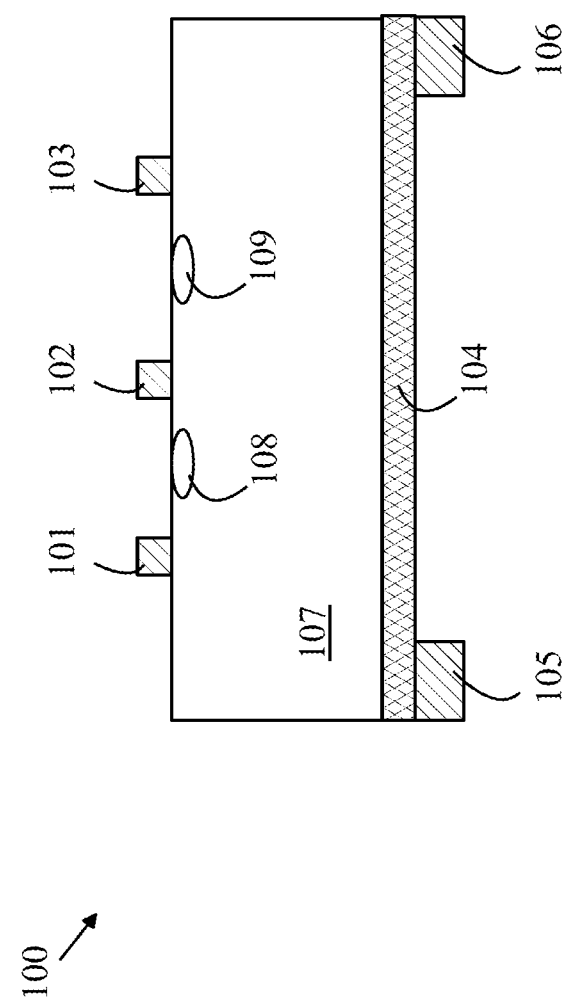
FIG. 13 is a cross-sectional view of a modulator according to another embodiment of the present invention.

In one aspect of the invention, the surface of the substrate opposite the surface on which the modulator is constructed includes an RF absorbing layer that dampens any such resonances. Refer now to FIG. 13, which is a cross-sectional view of a modulator according to another embodiment of the present invention. MZM 100 is constructed on a thick substrate 107 in a manner analogous to that discussed above. The thickness of substrate 107 is chosen such that MZM 100 would normally have resonances below the maximum RF modulation frequency at which MZM 100 is designed to operate in the absence of RF absorber 104. In addition, substrate 107 is thicker than the depth of the fields generated by conductors 101-103 to which the RF signal is applied to modulate the light signals in waveguides 108 and 109. That is, RF absorber 104 does not substantially reduce the electric fields that modulate the light signals in waveguides 108 and 109. RF absorber 104 is held at a fixed potential, preferably ground, by electrodes 105 and 106. Electrodes 105 and 106 are raised such that RF absorber 104 does not contact the package floor of the package containing MZM 100. In one aspect of the invention, RF absorber 104 is constructed from PolyIron; however, other absorbers could be utilized.

In another aspect of the invention, the bottom surface of substrate 107 is roughened such that RF radiation striking the surface is scattered rather than reflected. Since the resonances require multiple reflections with very small loses on each reflection, such roughening further reduces RF energy losses due to resonances. In addition, the bottom and side surfaces of substrate 107 can have shapes that inhibit resonances by providing a non-parallel surface from which the RF radiation reflects.

In principle, the length of the modulation region can be increased to increase the depth of modulation of the light signal. However, in practice, this approach does not provide the expected benefits because the RF signal and the light signal "see" different dielectric constants, and hence travel at different speeds down their respective waveguides. In long modulation regions, this leads to the modulation signal being out of phase with the light signal.

Figure 14B:
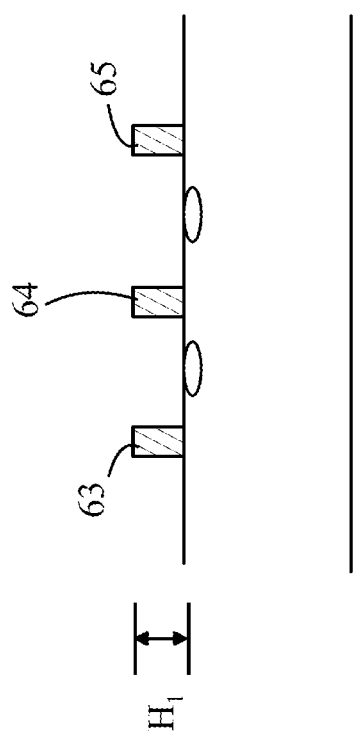
FIGS. 14a and 14b are cross-sectional views of a Mach-Zehnder Modulator.
Figure 14A:
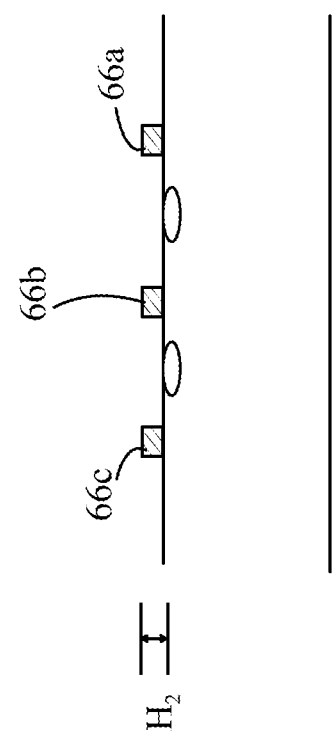

Refer now to FIGS. 14a and 14b, which are cross-sectional views of MZM 60 shown in FIG. 8 through lines 14a-14a and 14b-14b, respectively. Refer first to FIG. 14b. In the modulation region, the speed of the RF wave propagating in response to the RF signal on RF ground conductors 63-65 must, ideally, match the speed of the light signal traveling in the optical waveguides. If this condition is not met, the two waves will be out of synchrony in the modulation region, and hence, increasing the length of the modulation will not result in the desired increase in modulation in the light signal. For the purposes of this discussion, the RF signal path will be defined to be velocity matched to the optical signal path if the difference in transit time of the two waves in their respective wave guides is less than 10 percent of the period of the RF signal at the highest frequency for which the modulator is designed to operate. Obtaining velocity matching becomes increasingly more difficult as the length of modulation region is increased, as there will always be some degree of mismatch.

Unfortunately, the index of refraction of the LiNbO$_3$ substrate at RF frequencies is much larger than the index of refraction at the light optical frequencies, and hence, the two waves do not remain in synchrony. This asynchrony can be corrected by increasing the height, H$_1$, of the conductors in the CPW. The RF signal experiences an index of refraction that is the average of the speed in the air above the substrate and the speed in the substrate. By increasing the height of the conductors, the average is weighted toward the index in the air, and hence, the average index of refraction experienced by the RF signal is reduced, thereby providing a propagation speed that is more nearly equal to that of the optical signal in the optical waveguides.

In some applications, multiple modulators are used, and hence, reducing modulator-modulator cross talk is important. Such cross talk can occur when the RF fields in a first modulator enter a second modulator via the DC bias voltage cable that powers DC bias electrodes 66a-66c. In general, the DC bias electrodes have a significant lateral extent along the optical waveguide. If there is RF on the power cable, the RF signal will propagate down the DC bias electrodes from the point of entry to the ends and then reflect back. If the DC bias electrodes are also velocity-matched to the optical waveguides, this RF "noise" will also modulate the light signal in the second modulator. This additional modulation can cause problems in systems in which the light signals from two modulators are combined or subtracted. Hence, in one aspect of the invention, the DC bias electrodes are deliberately velocity mismatched relative to the optical waveguides. In one aspect of the invention, the height, $H_2$, of the DC bias conductors is chosen to reduce the velocity matching by choosing $H_2$ to be as small as possible. In one embodiment, $H_2$ is less than $0.1H_1$.

Refer again to FIG. 8. In principle, the DC bias electrodes could be located either on the RF input side of the optical waveguides or on the RF output side of the optical waveguides. For some applications, such as those described in PCT/US2014/021788, the RF and optical signal paths are dual directional. The placement of the DC electrodes can be optimized to minimize the impact of noise on the DC electrodes. In one aspect of the invention, the DC bias electrodes are located on the RF input side of the optical waveguides as shown in FIG. 8 to reduce the coupling of noise on the DC bias electrodes to the RF modulating signals. Typically, the RF signal entering the modulator is much greater than such noise in many applications, and hence, the noise has a small effect on the modulation. However, when the RF signal path is dual directional, and the RF modulating signal is a reflected RF signal from a DUT that enters the modulator through the output side of the CPW, the RF signal is relatively small, and any noise on the DC bias electrodes could interfere with the modulation of the light signal by this incoming RF signal. By placing the DC bias electrodes at the input side of the RF CPW, such noise will have less effect on the optical modulation, since the RF will have finished modulating the light signals by the time the RF is close enough to the DC bias electrodes to be altered by the noise.

As noted above, coupling the RF signals onto and off of the modulator presents challenges at frequencies above 100 GHz, particularly in embodiments in which a number of modulators must be placed in close proximity to one another. One of the problems in this regard relates to maintaining the impedance of the CPW to match the impedance of the RF device being driven by the RF signal. The CPW impedance is mainly governed by the ratio of the distance between the conductors and the center conductor width. To achieve 50 ohms on thick $LiNbO_3$, this ratio tends to be large, and hence, the center conductor width needs to be quite small for high-frequency operation, resulting in increased RF loss.

As noted above, the index of refraction, and hence, dielectric constant, that is "seen" by the CPW is the average of the dielectric constants of the media through which the electric field generated by the conductor passes. Hence, if a thin $LiNbO_3$ substrate is used on a dielectric layer having a low dielectric constant, a wider center conductor can be utilized, and hence, the RF losses reduced.

In another aspect of the invention, the $LiNbO_3$ is thinned to a thickness of less than about 10 microns and mounted on a low dielectric constant material such as $SiO_2$. As a result, the average dielectric constant seen by the conductors in the CPW is significantly reduced, and the size of the center can then be increased to reduce the RF losses and to provide more space for making connections to these conductors. In general, the thickness of the modulation layer should be within one fourth of the distance between the CPW conductors.

Figure 15:
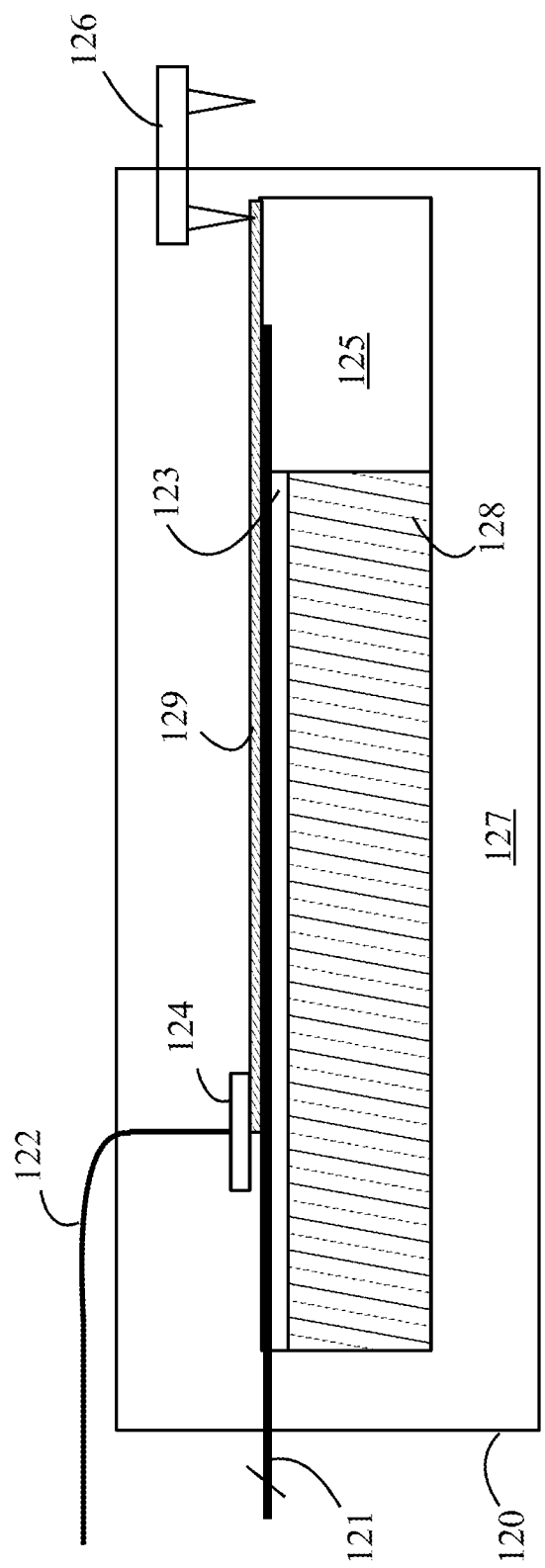
FIG. 15 is a side view of a modulator having a hybrid substrate.

Refer now to FIG. 15, which is a side view of a modulator having such a hybrid substrate. Modulator 120 includes a thin $LiNbO_3$ layer 123 in which the optical waveguides discussed above are constructed. The light signal that is to be modulated is input on a first optical fiber in optical cable 121, and the modulated light signal is output on a second optical fiber in optical cable 121. The $LiNbO_3$ substrate is mounted on a quartz substrate 128 that provides both structural support for the $LiNbO_3$ substrate and the low index of refraction layer discussed above. In addition, the low index of refraction quartz substrate is also sufficiently close to the CPW to further reduce the average dielectric constant seen by the RF modulation signal, and hence, further simplifying the synchronization between the RF wave and the light signal being modulated.

The output optical waveguide couples to a second optical waveguide in region 125 that has a sufficient difference in index of refraction between the core and cladding regions of the second optical waveguide to allow the waveguide to make a compact 180 degree bend and return and couple to optical cable 121. In one aspect of the invention, the bend has a radius of curvature of less than 1 cm. Region 125 can be constructed from a $SiO_2$ substrate having a silicon nitride waveguide. The RF signal is generated by photodiode 124, which receives an optical modulation signal over a fiber 122. The RF signal from photodiode 124 is coupled to a CPW 129 in a manner analogous to that described above. The conductors of CPW 129 continue into region 125. The RF signal on CPW 129 is output on a probe interface 126 for coupling to a DUT. Region 127 includes an RF absorber as described above to dampen any RF resonances in modulator 120.

The above described embodiments of the present invention utilize a MZM, which is constructed from X-cut $LiNbO_3$. However, the teachings of the present invention can be applied to other MZM structures and materials such as Z-cut $LiNbO_3$ or other optically active materials including semiconductors and polymers.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A modulator comprising:
    a Mach-Zehnder Modulator (MZM) characterized by first and second optical waveguides in a modulation layer and a co-planar waveguide (CPW), said CPW comprising first, second, and third conductors on said modulation layer and having segments that are substantially parallel to said first and second optical waveguides, one of said first, second, or third conductors comprising a crossing segment that crosses over one of said first and second optical waveguides at a crossing point, said crossing segment being separated from that optical waveguide by a patterned layer of dielectric material in a region including said crossing point, said patterned layer having a thickness sufficient to inhibit evanescent attenuation of light traveling in said first and second optical waveguides, said first, second, and third conductors being separated from said modulation layer by less than said thickness in regions in which said segments of said first, second, and third conductors are substantially parallel to said waveguides.

2. The modulator of claim 1 further comprising a plurality of conducting bridges connecting said first and third conductors, said bridges being separated from said first and second optical waveguides at points at which said bridges cross said first and second optical waveguides by a thickness of dielectric sufficient to inhibit evanescent attenuation of light traveling in first and second optical waveguides.

3. The modulator of claim 1 further comprising first and second bias electrodes positioned to create a first constant electric field in said first optical waveguide at a location chosen such that an optical signal in said first optical waveguide has not been modulated by a signal on said CPW when said optical signal traverses said location.

4. The modulator of claim 3 wherein said first, second, and third conductors of said CPW are characterized by a CPW metal height above said modulation layer and wherein said first and second bias electrodes are characterized by a bias electrode height, said bias electrode height being less than 0.1 times said CPW metal height.

5. The modulator of claim 1 wherein said first, second, and third conductors of said CPW comprise an elliptical bend.

6. The modulator of claim 1 further comprising a substrate having first and second opposing sides, said first opposing side comprising said RF output port and second opposing side comprising first and second optical ports, said first optical port being configured to receive an input optical signal that is to be modulated and said second optical port being configured to output said input optical signal after said input optical signal has been modulated.

7. The modulator of claim 6 wherein said first optical port comprises a sinuous Y-junction that splits said input optical signal into first and second optical signals that are coupled to said first and second optical waveguides, respectively.

8. The modulator of claim 1 wherein said modulator is configured to operate at RF frequencies below a maximum RF frequency and wherein said modulator further comprises a layer of RF absorbing material configured to dampen resonances in said modulator that occur at frequencies below said maximum RF frequency.

9. The modulator of claim 1 wherein said modulation layer is characterized by a first index of refraction, a first surface on which said patterned layer of dielectric material is deposited, and a second surface opposing said first surface, and wherein said modulator further comprises a second dielectric layer having a second index of refraction less than said first index of refraction, said dielectric layer being bonded to said second surface of said modulation layer, and
    wherein said first and second conductors and said first and third conductors are separated by a distance and wherein said modulation layer has a thickness that is less than one quarter of said distance.

\* \* \* \* \*